US011967334B2

(12) United States Patent
Best et al.

(10) Patent No.: US 11,967,334 B2
(45) Date of Patent: Apr. 23, 2024

(54) METHOD FOR OPERATING A HEARING DEVICE BASED ON A SPEECH SIGNAL, AND HEARING DEVICE

(71) Applicant: SIVANTOS PTE. LTD., Singapore (SG)

(72) Inventors: Sebastian Best, Erlangen (DE); Marko Lugger, Weilersbach (DE)

(73) Assignee: Sivantos Pte. Ltd., Singapore (SG)

( * ) Notice: Subject to any disclaimer, the term of this patent is extended or adjusted under 35 U.S.C. 154(b) by 333 days.

(21) Appl. No.: 17/460,552

(22) Filed: Aug. 30, 2021

(65) Prior Publication Data

US 2022/0068293 A1 Mar. 3, 2022

(30) Foreign Application Priority Data

Aug. 28, 2020 (DE) ..................... 10 2020 210 918.4
Aug. 28, 2020 (DE) ..................... 10 2020 210 919.2

(51) Int. Cl.
*G10L 25/78* (2013.01)
*G10L 21/0364* (2013.01)
(Continued)

(52) U.S. Cl.
CPC .......... *G10L 21/0364* (2013.01); *G10L 25/60* (2013.01); *H04R 25/405* (2013.01);
(Continued)

(58) Field of Classification Search
None
See application file for complete search history.

(56) References Cited

U.S. PATENT DOCUMENTS 7,165,025 B2 1/2007 Kim
2004/0167774 A1 8/2004 Shrivastav
(Continued)

FOREIGN PATENT DOCUMENTS

DE 19534981 A1 3/1997

OTHER PUBLICATIONS

Heidemann Andersen, A. et al., Nonintrusive Speech Intelligibility Prediction Using Convolutional Neural Networks. In: IEEE Transactions on Audio, Speech, and Language Processing, vol. 26,2018, No. 10, S. 1925-1939.—ISSN: 1558-7916.

*Primary Examiner* — Jakieda R Jackson
(74) *Attorney, Agent, or Firm* — Laurence A. Greenberg; Werner H. Stemer; Ralph E. Locher

(57) ABSTRACT

A method for operating a hearing device on the basis of a speech signal. An acousto-electric input transducer of the hearing device records a sound containing the speech signal from surroundings of the hearing device and converts the sound into an input audio signal. A signal processing operation generates an output audio signal based on the input audio signal. At least one articulatory and/or prosodic feature of the speech signal is quantitatively acquired through analysis of the input audio signal by way of the signal processing operation, and a quantitative measure of a speech quality of the speech signal is derived on the basis of the property. At least one parameter of the signal processing operation for generating the output audio signal based on the input audio signal is set on the basis of the quantitative measure of the speech quality of the speech signal.

12 Claims, 4 Drawing Sheets

(51) Int. Cl.
*G10L 25/60* (2013.01)
*H04R 25/00* (2006.01)

(52) U.S. Cl.
CPC ........... *H04R 25/407* (2013.01); *H04R 25/43* (2013.01); *H04R 25/505* (2013.01); *H04R 2225/43* (2013.01)

(56) References Cited

U.S. PATENT DOCUMENTS

| | | | | |
|---|---|---|---|---|
| 2009/0220109 | A1* | 9/2009 | Crockett | G10L 21/038 381/107 |
| 2011/0013794 | A1* | 1/2011 | Hau | H04R 25/356 381/321 |
| 2013/0039498 | A1* | 2/2013 | Adachi | A61B 5/12 704/E11.001 |
| 2014/0169601 | A1* | 6/2014 | Pedersen | H04R 25/48 381/316 |
| 2014/0336448 | A1* | 11/2014 | Banna | A61N 1/36038 607/57 |
| 2015/0367132 | A1* | 12/2015 | Milczynski | A61N 1/0541 607/3 |
| 2016/0261959 | A1* | 9/2016 | Harczos | H04R 25/353 |
| 2016/0336015 | A1* | 11/2016 | Pandey | H04R 25/356 |
| 2018/0115840 | A1* | 4/2018 | Tu | H04R 25/356 |
| 2018/0125415 | A1* | 5/2018 | Reed | A61B 5/4803 |
| 2018/0184213 | A1* | 6/2018 | Lesimple | H04R 25/356 |
| 2018/0255406 | A1 | 9/2018 | Sorensen et al. | |
| 2019/0356991 | A1* | 11/2019 | Farver | A61F 11/145 |
| 2020/0007995 | A1* | 1/2020 | Pedersen | H04R 25/356 |
| 2020/0243094 | A1* | 7/2020 | Thomson | G10L 15/32 |

* cited by examiner

METHOD FOR OPERATING A HEARING DEVICE BASED ON A SPEECH SIGNAL, AND HEARING DEVICE

CROSS-REFERENCE TO RELATED APPLICATION

This application claims the priority, under 35 U.S.C. § 119, of German patent applications DE 102020210918.4 and DE 102020210919.2, both filed Aug. 28, 2020; the prior applications are herewith incorporated by reference in their entirety.

FIELD AND BACKGROUND OF THE INVENTION

The invention relates to a method for operating a hearing device on the basis of a speech signal, wherein an acousto-electric input transducer of the hearing device records a sound containing the speech signal from surroundings of the hearing device and converts it into an input audio signal, wherein a signal processing operation generates an output audio signal based on the input audio signal, which output audio signal is converted into an output sound by an electro-acoustic output transducer, wherein at least one parameter of the signal processing operation for generating the output audio signal based on the input audio signal is set on the basis of the speech signal.

One important objective in the application of hearing devices, such as for example hearing aids, but also headsets or communication devices, is often that of outputting a speech signal as precisely as possible, that is to say in particular in a manner as acoustically intelligible as possible, to a user of the hearing device. For this purpose, in an audio signal that is generated based on a sound containing a speech signal, interfering noise is often suppressed from the sound in order to emphasize the signal components that represent the speech signal and thus improve intelligibility thereof. However, noise suppression algorithms may often reduce the sound quality of a resultant output signal, with artefacts in particular possibly arising due to the signal processing of the audio signal, and/or an auditory impression is generally perceived as being less natural.

Noise suppression is usually performed in this context based on characteristic variables that primarily concern noise or the overall signal, that is to say for example a signal-to-noise ratio (SNR), a noise floor, or else a level of the audio signal. This approach to controlling noise suppression may however ultimately lead to noise suppression being applied even when this would absolutely not be necessary, even though there is considerable interfering noise, because the speech components are still easily understandable in spite of the interfering noise. In this case, this introduces the risk that sound quality may be worsened, for example caused by noise suppression artefacts, without this really being necessary. On the other hand, a speech signal that is overlaid only with little noise, and in this respect the associated audio signal has a good SNR, may also have a low speech quality when the speaker has poor articulation (for example when the speaker mumbles, or the like).

SUMMARY OF THE INVENTION

It is accordingly an object of the invention to provide a method which overcomes the above-mentioned disadvantages of the heretofore-known devices and methods of this general type and which provides for a method by way of which it is possible to operate a hearing device on the basis of a measure that is as objective as possible of a speech quality of a speech signal. It is a further object to specify a hearing device that is configured to operate on the basis of a speech quality of a speech signal.

With the above and other objects in view there is provided, in accordance with the invention, a method of operating a hearing device on a basis of a speech signal, the method which comprises:

recording with an acousto-electric input transducer of the hearing device a sound which contains the speech signal from surroundings of the hearing device, and converting the sound into an input audio signal;

performing a signal processing operation for generating an output audio signal based on the input audio signal;

quantitatively acquiring at least one articulatory and/or prosodic feature of the speech signal through analysis of the input audio signal by way of the signal processing operation, and deriving from the property a quantitative measure of a speech quality of the speech signal; and setting at least one parameter of the signal processing operation for generating the output audio signal on a basis of the quantitative measure of the speech quality of the speech signal.

In other words, the first above-named object is achieved, according to the invention, by way of a method for operating a hearing device on the basis of a speech signal, wherein an acousto-electric input transducer of the hearing device records a sound containing the speech signal from surroundings of the hearing device and converts it into an input audio signal, wherein a signal processing operation generates an output audio signal based on the input audio signal, wherein at least one articulatory and/or prosodic property of the speech signal is quantitatively acquired through analysis of the input audio signal by way of the signal processing operation, and a quantitative measure of a speech quality of the speech signal is derived on the basis of said property, and wherein at least one parameter of the signal processing operation for generating the output audio signal based on the input audio signal is set on the basis of the quantitative measure of the speech quality of the speech signal. Advantageous embodiments, some of which are inventive on their own, are the subject of the dependent claims and the following description.

The second above-named object is achieved, according to the invention, by way of a hearing device comprising an acousto-electric input transducer that is designed to record a sound from surroundings of the hearing device and to convert it into an input audio signal, a signal processing apparatus that is designed to generate an output audio signal from the input audio signal, wherein the hearing device is designed to perform the method as described above.

The hearing device according to the invention shares the advantages of the method according to the invention, which is able to be performed in particular by way of the hearing device according to the invention. The advantages mentioned below for the method and for its developments may be transferred analogously in this case to the hearing device.

In the method according to the invention, the output audio signal is preferably converted into an output sound by an electro-acoustic output transducer. The hearing device according to the invention preferably has an electro-acoustic output transducer that is designed to convert the output audio signal into an output sound.

An acousto-electric input transducer is in this case understood in particular to comprise any transducer that is configured to generate an electrical audio signal from a sound from the surroundings, such that sound-induced air movements and air pressure fluctuations at the location of the transducer are able to be reproduced through corresponding oscillations of an electrical variable, in particular a voltage in the generated audio signal. The acousto-electric input transducer may in particular be a microphone. An electro-acoustic output transducer accordingly comprises any transducer that is designed to generate an output sound from an electrical audio signal, that is to say in particular a loudspeaker (such as for instance a balanced metal case receiver), but also a bone conduction hearing device or the like.

The signal processing operation is performed in particular by way of an appropriate signal processing apparatus that is designed to perform the calculations and/or algorithms provided for the signal processing operation by way of at least one signal processor. The signal processing apparatus is in this case in particular arranged on the hearing device. The signal processing apparatus may however also be arranged on an auxiliary device that is designed for connection to the hearing device in order to exchange data, that is to say for example a smartphone, a smartwatch, or the like. The hearing device may then for example transmit the input audio signal to the auxiliary device, and the analysis is performed by way of the computing resources provided by the auxiliary device. As a result of the analysis, the quantitative measure of the speech quality may then be transmitted back to the hearing device, and the at least one signal processing parameter may accordingly be set there.

The analysis may in this case be performed directly on the input audio signal, or based on a signal derived from the input audio signal. Such a derived signal may in this case in particular be the isolated speech signal component, but also an audio signal as may be generated for example in a hearing device by a feedback loop by way of a compensation signal for compensating acoustic feedback or the like, or by a directional signal that is generated on the basis of a further input audio signal of a further input transducer.

An articulatory property of the speech signal in this case comprises in particular a precision of formants, in particular vowels, and a dominance of consonants, in particular fricatives and/or plosives. This makes it possible to make a statement that a speech quality is deemed to be higher the higher the precision of the formants or the higher the dominance and/or the precision of consonants. A prosodic property of the speech signal in particular comprises a temporal stability of a fundamental frequency of the speech signal and a relative acoustic intensity of accents.

Noise generation conventionally involves three physical components of a sound source: A mechanical oscillator, such as for example a string or diaphragm, which sets air surrounding the oscillator in vibration, an excitation of the oscillator (for example through plucking or striking), and a resonant body. The oscillator is set in oscillation by the excitation, such that the air surrounding the oscillator is set in pressure vibration through the vibrations of the oscillator, these pressure vibrations propagating in the form of sound waves. In this case, not just vibrations of a single frequency are excited in the mechanical oscillator, but also vibrations of different frequencies, with the spectral composition of the propagating vibrations defining the overall sound. The frequencies of particular vibrations are in this case often in the form of integer multiples of a fundamental frequency, and are referred to as "harmonics" of this fundamental frequency. More complex spectral patterns may however also develop, meaning that not all of the generated frequencies are able to be represented as harmonics of the same fundamental frequency. The resonance of the generated frequencies in the resonance space is also relevant here to the overall sound, since particular frequencies generated by the oscillator in the resonance space are often attenuated in relation to the dominant frequencies of a sound.

Applied to the human voice, this means that the mechanical oscillator is defined by the vocal cords, and the excitation thereof in the air flowing out of the lungs and past the vocal cords, wherein the resonance space is formed primarily by the throat and oral cavity. The fundamental frequency of a male voice is in this case mainly in the range from 60 Hz to 150 Hz, and for women mainly in the range from 150 Hz to 300 Hz. Due to the anatomical differences between individual people, both in terms of their vocal cords and in particular in terms of the throat and oral cavity, voices that initially sound different are formed. The resonance space is in this case able to be changed by changing the volume and the geometry of the oral cavity through appropriate jaw and lip movements, giving rise to frequencies characteristic for the generation of vowels, what are known as formants. These are each located in unchangeable frequency ranges for individual vowels (known as the "formant ranges"), wherein a vowel is usually already clearly audibly delimited from other sounds by the first two formants F1 and F2 of a series of often four formants (cf. "vowel triangle" and "vowel trapezoid"). The formants are in this case formed independently of the fundamental frequency, that is to say the frequency of the fundamental vibration.

The precision of formants should in this sense be understood to mean in particular a degree of concentration of acoustic energy on formant ranges that are able to be distinguished from one another, in particular in each case on individual frequencies in the formant ranges, and a resulting ability to discern the individual vowels on the basis of the formants.

To generate consonants, the airflow flowing past the vocal cords is partially, or completely, blocked at at least one point, resulting inter alia also in the formation of turbulence in the airflow, for which reason only some consonants are able to be assigned a formant structure similarly clear to vowels, and other consonants have a more wideband frequency structure. However, consonants may also be assigned particular frequency bands in which the acoustic energy is concentrated. Due to the more percussive "noise property" of consonants, these are generally above the formant ranges of vowels, specifically primarily in the range of around 2 to 8 kHz, while the ranges of the most important formants F1 and F2 of vowels generally end at around 1.5 kHz (F1) or 4 kHz (F2). The precision of consonants is defined in this case in particular by a degree of concentration of the acoustic energy on the corresponding frequency ranges and a resultant ability to discern the individual consonants.

The ability to distinguish between the individual components of a speech signal, and thus the possibility of being able to resolve these components, does not however depend solely on articulatory aspects. While these primarily concern the acoustic precision of the smallest isolated sound events of speech, known as phonemes, prosodic features also define the speech quality, since in this case a statement is able to be given a particular meaning through intonation and accentuation, in particular across several segments, that is to say several phonemes or phoneme groups, such as for example by raising the pitch at the end of a sentence to specify a question or by emphasizing a specific syllable in a word in order to distinguish between different meanings (cf. "drive around" versus "drive around") or emphasizing a word in order to highlight it. In this respect, it is possible to quantitatively acquire a speech quality for a speech signal also based on prosodic properties, in particular as mentioned above, by determining for example measures of a temporal variation of the pitch of the voice, that is to say its fundamental frequency, and for distinctness lowering of the amplitude and/or level maxima.

Based on one or more of said and/or further quantitatively acquired articulatory and/or prosodic properties of the speech signal, it is thus possible to derive the quantitative measure of the speech quality and to control the signal processing operation on the basis of this measure. The quantitative measure of the speech quality thus refers in this case to the speech production of a speaker who may exhibit deficits (such as for example lisping or mumbling) as far as speech impediments from pronunciation perceived as being "clean" and that accordingly reduce the speech quality.

In contrast to variables relating to propagation of speech in surroundings, such as for example the speech intelligibility index (SII), which weights the individual speech and noise components in bands, or the speech transmission index (STI), which acquires the effect of a transmission channel on the modulation depth by way of a test signal replicating the modulation of human speech, the present measure here for the is in this case in particular independent of the external properties of a transmission channel, such as for example a propagation in a possibly echoey space or loud surroundings, rather preferably only dependent on the intrinsic properties of the speech generation of the speaker.

This means in particular that, in quiet surroundings and/or surroundings containing only little background noise, it is possible to identify a reduced speech quality (with reference to a reference value that is preferably defined for a speech quality perceived as "very good") and to correct it by way of the signal processing operation. This is applicable in particular in situations in which a good SNR is actually present, and no or only a small amount of processing of the input audio signal by the signal processing operation would thus be necessary (possibly with the exception of an audiologically induced signal processing operation intended to appropriately individually compensate a hearing impediment of a user of the hearing device), such that a poor speech quality of a speech signal contained in the input audio signal is able to be improved in a targeted manner through the signal processing operation. In this case, one or more of the following control variables may be set as the at least one parameter: A gain factor (wideband or frequency band-dependent), a compression ratio or a knee point of a wideband or frequency band-dependent compression, a time constant of an automatic gain control operation, a magnitude of noise suppression, a directional effect of a directional signal.

A gain factor, and/or a compression ratio, and/or a knee point of a compression, and/or a time constant of an automatic gain control (AGC) operation, and/or a magnitude of noise suppression, and/or a directional effect of a directional signal is preferably set as the at least one parameter of the signal processing operation on the basis of the quantitative measure of the speech quality of the speech signal. In this case, the parameter may also in particular be in the form of a frequency-dependent parameter, that is to say for example a gain factor of a frequency band, a frequency-dependent compression variable (compression ratio, knee point, attack or release) of a multiband compression, a frequency band-wise directional parameter of a directional signal. Said control variables make it possible to even further improve an insufficient speech quality, in particular in the case of inherent low noise (or high SNR).

Expediently, the gain factor is in this case increased, or the compression ratio is increased, or the knee point of the compression is lowered, or the time constant is shortened, or the noise suppression is attenuated, or the directional effect is increased when the quantitative measure indicates worsening of the speech quality.

In particular for an improvement in the speech quality, indicated by a corresponding change of the quantitative measure (toward a "better" binary value or toward a "better" value range in the continuous or discretized case), the opposing measure may be taken, that is to say the gain factor may be lowered, or the compression ratio may be lowered, or the knee point of the compression may be increased, or the time constant may be lengthened, or the noise suppression may be increased, or the directional effect may be reduced.

Specifically for reproducing speech through a hearing device, attempts are usually made to output a speech signal in a range of preferably 55 dB to 75 dB, particularly preferably 60 dB to 70 dB, since, below this range, the intelligibility of speech may be impaired and, above this range, the noise level is already perceived as unpleasant by many humans and also no further improvement is achieved through further amplification. Therefore, in the case of insufficient speech quality, the gain may be increased moderately above a value that is actually provided for a "normally intelligible" speech signal, and a potentially very loud speech signal may be lowered slightly in the case of particularly good speech quality.

Compressing an audio signal initially leads, above what is known as a knee point of the compression with an increasing signal level, to this being increasingly lowered by what is known as the compression ratio. A higher compression ratio in this case means a lower gain with an increasing signal level. The relative reduction in the gain for signal levels above the knee point is usually performed here at an attack time, wherein, after a release time with signal levels without exceeding the knee point, the compression is canceled again.

Above the knee point kp, the level Pout of the output signal is however able to be determined as follows on the basis of the input level Pin (all level values taken to be in dB):

$$Pout\ (\mathrm{dB})=[Pin\ (\mathrm{dB})-kp\ (\mathrm{dB})]/r+kp,$$

wherein r is the compression ratio. A compression ratio of 2:1 thus means that, above the knee point kp, in the case of an increase in an input level by 10 dB, the output level rises by only a further 5 dB.

Such a compression is usually applied in order to cut off signal levels, and thus to be able to amplify the entire audio signal more without the level peaks leading to overdrive and thus to distortion of the audio signal. If, in the case of worsening of the speech quality, the knee point of the compression is thus lowered or the compression ratio is increased, this means that more reserves are available for the gain increase following the compression, meaning that quieter signal components of the input audio signal are able to be better emphasized. On the other hand, in the case of an improvement in the speech quality, the knee point may be raised, or the compression ratio may be reduced (that is to say set closer to linear gain), meaning that the dynamics of the input audio signal are compressed only at higher levels or to a smaller extent, meaning that the natural auditory impression is able to be better maintained.

For time constants of an AGC, it is generally the case that excessively short attack times may tend to lead to an unnatural acoustic perception, and are therefore preferably avoided. In the case of a comparatively poor speech quality, however, the advantages of a faster response capability of the AGC in terms of improving speech intelligibility may outweigh the potential disadvantages of the acoustic perception. The same also applies to the directional effect of directional signals: In general, a highly directional signal may impair the spatial auditory perception, meaning that sound sources are possibly no longer correctly located by the auditory impression. Last but not least, since this may also be relevant, for example in road traffic, to the safety of a user of a hearing device, attempts are usually made to use directional signals only when and to such an extent that the use thereof appears to be absolutely necessary (for example in order to emphasize a conversation partner). However, if a poor speech quality is present, the directional effect may also be further increased. Noise suppression, such as for example spectral subtraction or the like, may likewise be increased when a poor speech quality is identified, even if this would not be necessary solely due to the SNR. Noise suppression methods are usually used only when necessary, since for example audible artefacts may be formed.

On the other hand, in the case of an improvement in the speech quality, a time constant of the AGC may be lengthened, or the directional effect may be reduced, since the natural sound space should presumably be given preference, and additional emphasis of the speech signal by way of directional microphones for speech intelligibility purposes is not necessary, or is necessary only to a small extent. Non-directional noise suppression, for example by way of a Vienna filter, may likewise be applied to a greater extent, since a moderate impairment of the speech quality may potentially still be considered acceptable here.

It proves to be even more advantageous when a multiplicity of frequency bands are each inspected for signal components of the speech signal, and the at least one parameter of the signal processing operation is set on the basis of the quantitative measure of the speech quality of the speech signal only in those frequency bands in which a sufficiently high signal component of the speech signal is ascertained. This means in particular that, for those frequency bands in which absolutely no signal components of the speech signal are identified, or in which the ascertained signal components of the speech signal are below a relevance threshold, the parameters of the signal processing operation are set independently of the ascertained speech quality, and are thus rated in particular in accordance with the otherwise conventional criteria such as SNR, etc. It is thereby possible to ensure that there is no “co-modulation” in actually irrelevant frequency bands by the speech signal and its speech quality.

Expediently, for the quantitative measure of the speech quality as articulatory property of the speech signal, a characteristic variable correlated with the precision of predefined formants of vowels in the speech signal, and/or a characteristic variable correlated with the dominance of consonants, in particular fricatives and/or plosives, in the speech signal and/or a characteristic variable correlated with the precision of transitions from voiced and unvoiced sounds is acquired, and/or, as prosodic property of the speech signal, a characteristic variable correlated with a temporal stability of a fundamental frequency of the speech signal and/or a characteristic variable correlated with an acoustic intensity of accents of the speech signal is acquired.

In order to acquire the characteristic variable correlated with the dominance of consonants in the speech signal, it is possible in this case for example to calculate a first energy contained in a low frequency range, to calculate a second energy contained in a frequency range higher than the low frequency range, and to form the characteristic variable based on a ratio, and/or a ratio weighted over the respective bandwidths of said frequency ranges, of the first energy and the second energy.

In order to acquire the characteristic variable correlated with the precision of the transitions from voiced and unvoiced sounds, a distinction may be made between voiced temporal sequences and unvoiced temporal sequences based on a correlation measurement and/or based on a zero crossing rate, a transition from a voiced temporal sequence to an unvoiced temporal sequence or from an unvoiced temporal sequence to a voiced temporal sequence may be ascertained, the energy contained in the voiced or unvoiced temporal sequence prior to the transition may be ascertained for at least one frequency range, and the energy contained in the unvoiced or voiced temporal sequence following the transition may be ascertained for the at least one frequency range. The characteristic variable is then ascertained based on the energy prior to the transition and based on the energy following the transition.

In order to acquire the characteristic variable correlated with the precision of predefined formants of vowels in the speech signal, a signal component of the speech signal in at least one formant range in the frequency space may for example be ascertained, a signal variable correlated with the level may be ascertained for the signal component of the speech signal in the at least one formant range, and the characteristic variable may be ascertained based on a maximum value and/or based on a temporal stability of the signal variable correlated with the level.

In order to acquire the characteristic variable correlated with the acoustic intensity of accents of the speech signal, a variable correlated with the volume, such as for example a level or the like, may be acquired in a temporally resolved manner for the speech signal, for example, a quotient of a maximum value of the variable correlated with the volume to a mean of said variable, ascertained over a predefined time interval, may be formed over the predefined time interval, and the characteristic variable may be ascertained on the basis of said quotient that is formed from the maximum value and the mean of the variable correlated with the volume over the predefined time interval.

Expediently, for the quantitative measure of the speech quality as an articulatory property of the speech signal, a characteristic variable correlated with an articulation of consonants is acquired, for example a characteristic variable correlated with the dominance of consonants, in particular fricatives and/or plosives, in the speech signal, and/or a characteristic variable correlated with the precision of transitions from voiced and unvoiced sounds, and a gain factor of at least one frequency band characteristic for the formation of consonants is boosted as the at least one parameter when the quantitative measure indicates insufficient articulation of consonants. This means in particular: An articulation of consonants is rated in the quantitative measure of the speech quality. If it is identified in this case that the articulation of consonants is comparatively poor, for example through comparison with an appropriate limit value, then it is possible to raise those frequency ranges in which the acoustic energy of consonants is concentrated (that is to say for example 2 kHz to 10 kHz, preferably 3.5 kHz to 8 kHz) by a predefined amount or in a manner dependent on a deviation from the limit value. Instead of a comparison with a limit value, a monotonic function of the quantitative measure may also be used here to raise the frequency bands in question.

Advantageously, a binary measure is derived as the quantitative measure, which binary measure adopts a first value or a second value depending on the speech quality, wherein the first value is assigned to a sufficiently good speech quality of the speech signal and the second value is assigned to an insufficient speech quality of the speech signal, wherein, for the first value, the at least one parameter of the signal processing operation is preset to a first parameter value that corresponds to a regular mode of the signal processing operation, and wherein, for the second value, the at least one parameter of the signal processing operation is set to a second parameter value different from the first parameter value.

This means in particular: The quantitative measure makes it possible to distinguish the speech quality in terms of two values, wherein the first value (for example value 1) corresponds to a relatively better speech quality, and the second value (for example value 0) corresponds to a worse speech quality. In the case of sufficiently good speech quality (first value), the signal processing operation is performed in accordance with a preset, wherein the first parameter value is preferably used in the same way as in a signal processing operation without any dependence on a quantitatively acquired speech quality. This preferably defines a regular signal processing mode for the at least one parameter, that is to say in particular a signal processing operation as would take place if no speech quality were to be acquired as criterion.

If there is then "worsening" of the speech quality to the extent that the quantitative measure adopts the "worse" second value from the first value assigned to the better speech quality, the second parameter value is set and is preferably selected such that the signal processing operation is suitable for improving the speech quality.

In this case, for a transition of the quantitative measure from the first value to the second value, the at least one parameter is preferably faded constantly from the first parameter value to the second parameter value. Abrupt transitions in the output audio signal that could be perceived as unpleasant are thereby avoided.

In one advantageous embodiment, a discrete measure is derived as the quantitative measure of the speech quality, which discrete measure adopts a value from a value range of at least three discrete values depending on the speech quality: individual values of the quantitative measure are mapped monotonically onto corresponding discrete parameter values for the at least one parameter. A discrete value range containing more than just two values for the quantitative measure makes it possible to acquire the speech quality with a higher resolution, and in this respect provides the option of giving more detailed consideration to the speech quality when controlling the signal processing operation.

In a further advantageous, in particular alternative embodiment, a constant measure is derived as the quantitative measure, which constant measure adopts a value from a continuous value range depending on the speech quality, wherein individual values of the quantitative measure are mapped monotonically onto corresponding parameter values from a continuous parameter interval for the at least one parameter. A constant measure in particular comprises such a measure that is based on a constant calculation algorithm, wherein infinitesimal discretizations caused by the digital acquisition of the input audio signal and the calculation should be ignored (and in particular should be considered to be constant).

For a measure whose values are continuous, the at least one parameter may be set in monotonic and in particular at least piecewise constant dependency on the quantitative measure. If for example the measure m of the speech quality adopts values of 0 (poor) to 1 (good), then a (frequency-dependent or wideband) gain factor G may be varied constantly monotonically between a maximum value Gmax (for m=0) and a minimum value Gmin (for m=1), forming the parameter interval [Gmin, Gmax], depending on $m \in [0,1]$, as parameter. A limit value $m_L$ for m may in particular also be provided in this case, above which the gain factor Gmin is constantly adopted, that is to say for example G (m)=Gmin for $m \geq m_L$. In this case, "worsening" of the speech quality should be considered as meaning the quantitative measure m dropping below the limit value $m_L$. The same applies, mutatis mutandis, to a quantitative measure with a discrete value range of more than two values and to control variables other than the at least one parameter to be set.

Preferably, a speech activity is detected and/or an SNR in the input audio signal is ascertained, wherein the at least one parameter of the signal processing operation for generating the output audio signal based on the input audio signal on the basis of the quantitative measure of the speech quality of the speech signal is additionally set on the basis of the detected speech activity or the ascertained SNR. This comprises in particular the fact that the analysis of the input audio signal in terms of articulatory and/or prosodic properties of a speech signal may already be suspended when no speech activity is detected in the input/output audio signal, and/or when the SNR is too poor (that is to say for example lies below a predefined limit value), and a corresponding noise suppression signal processing operation is considered to be a priority.

The hearing device is preferably designed as a hearing aid. The hearing aid may in this case be a monaural hearing aid or a binaural hearing aid with two local hearing aids that are to be worn by the user of the hearing aid on his respective right or left ear. The hearing aid may in particular, in addition to said input transducer, also have at least one further acousto-electric input transducer that converts sound from the surroundings into a corresponding further input audio signal, such that the at least one articulatory and/or prosodic property of a speech signal is able to be quantitatively acquired by analyzing a multiplicity of contributing input audio signals. In the case of a binaural hearing aid, two of the input audio signals that are used may each be generated in different local units of the hearing aid (that is to say respectively at the left or at the right ear). The signal processing apparatus may in this case in particular comprise signal processors of both local units, wherein respectively locally generated measures of the speech quality, depending on the considered articulatory and/or prosodic property, are preferably appropriately combined by averaging or a maximum or minimum value for both local units. For a binaural hearing aid, the at least one parameter of the signal processing operation may in particular concern binaural operation, that is to say for example it is possible to control a directionality of a directional signal.

Other features which are considered as characteristic for the invention are set forth in the appended claims.

Although the invention is illustrated and described herein as embodied in a method for operating a hearing device on the basis of a speech signal, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Parts and variables corresponding to one another are provided with the same reference signs throughout the figures.

DETAILED DESCRIPTION OF THE INVENTION

Figure 1:
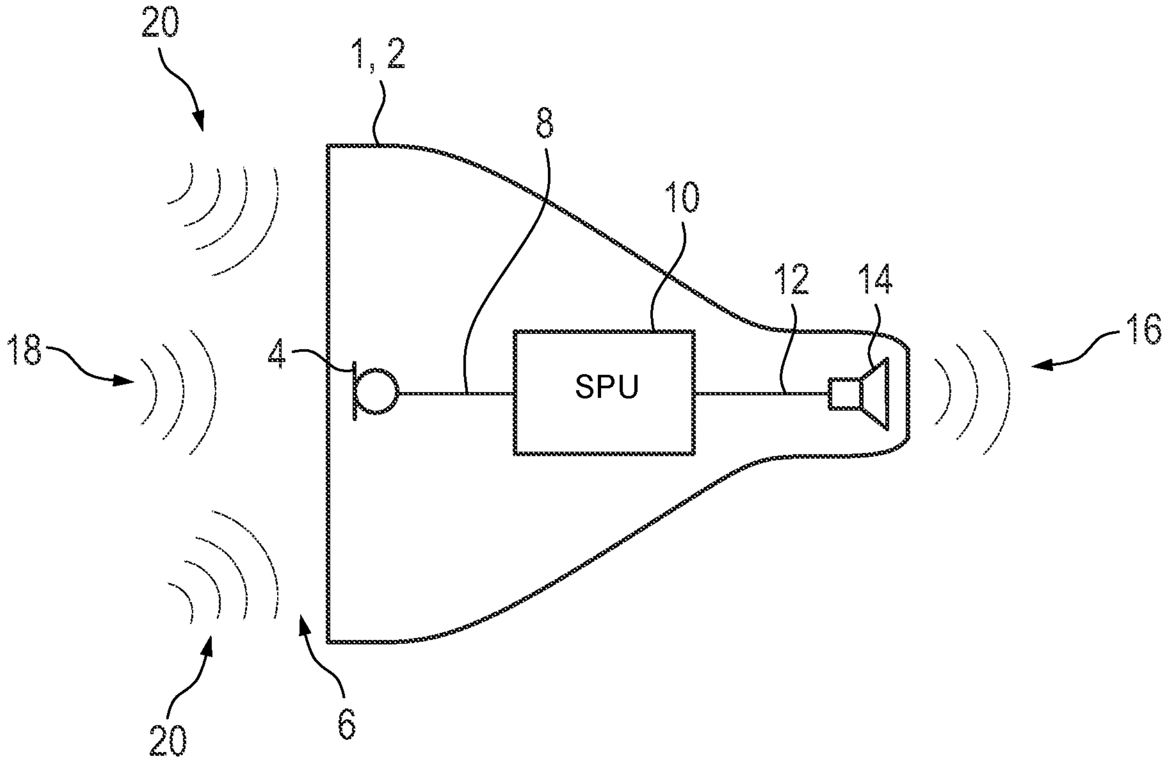
FIG. 1 shows a schematic circuit diagram of a hearing aid that acquires a sound containing a speech signal.

Referring now to the figures of the drawing in detail and first, in particular, to FIG. 1 thereof, there is shown a schematic circuit diagram of a hearing device 1, which, in the exemplary embodiment, is a hearing aid 2. The hearing aid 2 has an acousto-electric input transducer 4 that is designed to convert a sound 6 from the surroundings of the hearing aid 2 into an input audio signal 8. An embodiment of the hearing aid 2 having a further input transducer that generates a corresponding further input audio signal from the sound 6 from the surroundings is also conceivable here. The hearing aid 2 is in this case designed as a standalone monaural hearing aid. A design of the hearing aid 2 as a binaural hearing aid having two local hearing aids that are to be worn by the user of the hearing aid 2 on the respective right or left ear is also within the realm of the disclosure.

The input audio signal 8 is fed to a signal processing apparatus or signal processing unit (SPU) 10 of the hearing aid 2, in which the input audio signal 8 is processed appropriately, in particular in accordance with the audiological requirements of the user of the hearing aid 2, and is in the process for example amplified and/or compressed in terms of frequency band. The signal processing apparatus 10 is for this purpose embodied by way of an appropriate signal processor and a working memory that can be addressed via the signal processor. Any preprocessing of the input audio signal 8, such as for example A/D conversion and/or preamplification of the generated input audio signal 8, should be considered here as part of the input transducer 4.

The signal processing apparatus 10, by processing the input audio signal 8, generates an output audio signal 12 that is converted into an output sound signal 16 of the hearing aid 2 by way of an electro-acoustic output transducer 14. The input transducer 4 is in this case preferably formed by a microphone, and the output transducer 14 is formed for example by a loudspeaker (such as for instance a balanced metal case receiver), but may also be formed by a bone conduction hearing device or the like.

The sound 6 from the surroundings of the hearing aid 2 that is acquired by the input transducer 4 contains, inter alia, a speech signal 18 from a speaker, not illustrated in more detail, and other sound components 20, which may comprise in particular directional and/or diffuse interfering noise (interfering sound or background noise), but may also contain such noise that could be considered to be a payload signal depending on the situation, that is to say for example music or acoustic warning or information signals concerning the surroundings.

The signal processing operation on the input audio signal 8 performed in the signal processing apparatus 10 in order to generate the output audio signal 12 may in particular comprise suppression of signal components that suppress the interfering noise contained in the sound 6, or relative boosting of the signal components representing the speech signal 18 in relation to the signal component representing the other sound components 20. Frequency-dependent or wideband dynamic compression and/or amplification and noise suppression algorithms may in particular also be applied in this case.

In order to make the signal components in the input audio signal 8 that represent the speech signal 18 as audible as possible in the output audio signal 12 and nevertheless to give the user of the hearing aid 2 the most natural possible auditory impression in the output sound 16, a quantitative measure of the speech quality of the speech signal 18 should be ascertained in the signal processing apparatus 10 for controlling the algorithms to be applied to the input audio signal 8. This is described with reference to FIG. 2.

Figure 2:
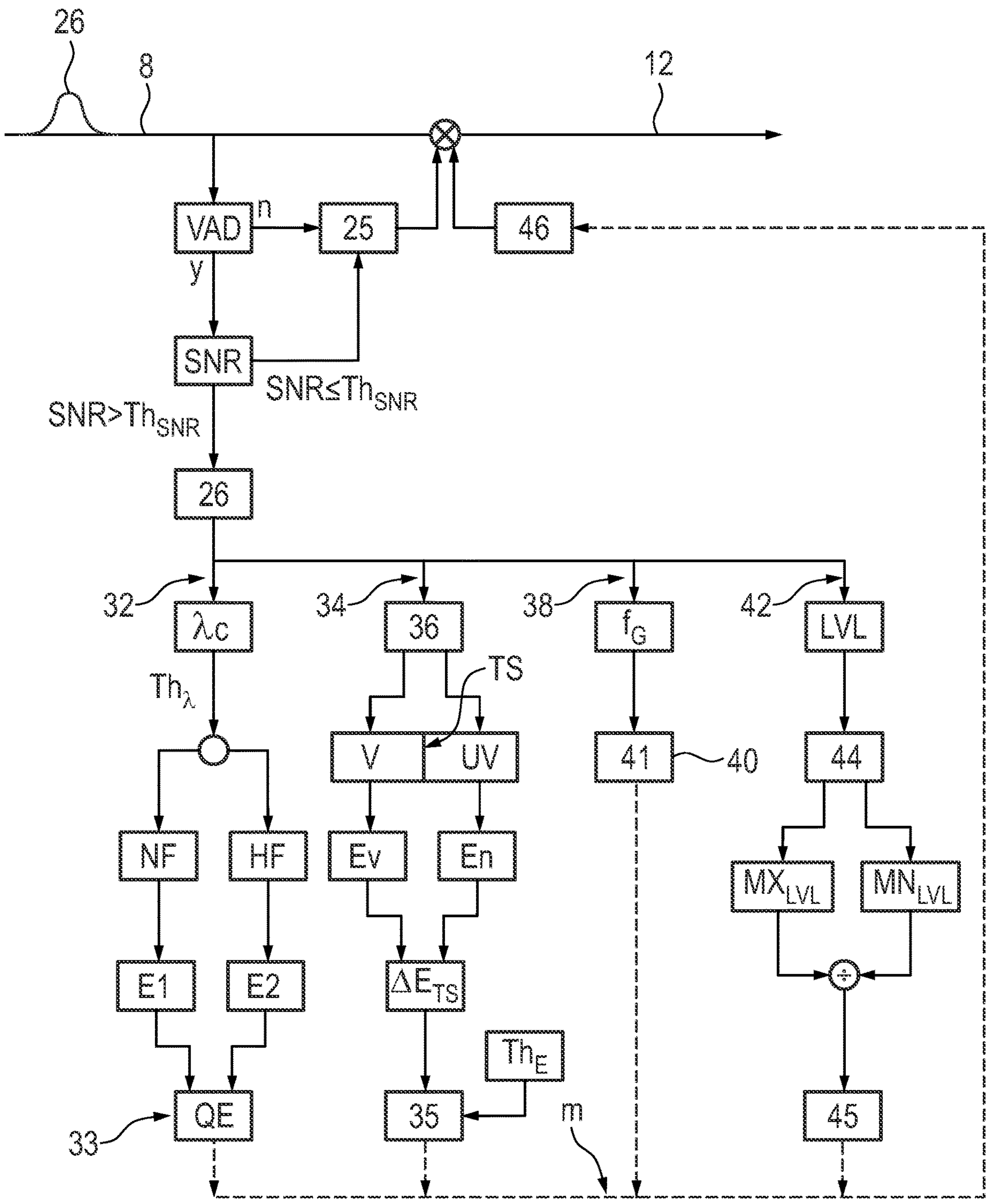
FIG. 2 shows a block diagram of a method for ascertaining a quantitative measure of the speech quality of the speech signal according to FIG. 1.

FIG. 2 shows a block diagram of a processing operation on the input audio signal 8 of the hearing aid 2 according to FIG. 1. Speech activity VAD identification is first of all performed for the input audio signal 8. If no noteworthy speech activity is present (path "n"), then the signal processing operation is performed on the input audio signal 8 in order to generate the output audio signal 12 using a first algorithm 25. The first algorithm 25, in a manner predefined beforehand, in this case rates signal parameters of the input audio signal 8 such as for example level, background noise, transients or the like, in wideband and/or in particular frequency band-wise manner, and ascertains therefrom individual parameters, for example frequency band-wise gain factors and/or compression characteristic data (that is to say primarily knee point, ratio, attack, release) that are to be applied to the input audio signal 8.

The first algorithm 25 may in particular also make provision to classify an auditory situation that is created in the sound 6, and to set individual parameters on the basis of the classification, potentially as appropriate for an auditory program provided for a specific auditory situation. In addition to this, the individual audiological requirements of the user of the hearing aid 2 may also be taken into consideration for the first algorithm 25 in order to be able to compensate a hearing impairment of the user as well as possible by applying the first algorithm 25 to the input audio signal 8.

If however noteworthy speech activity is identified in the speech activity VAD identification (path "y"), then an SNR is ascertained next and compared with a predefined limit value $Th_{SNR}$. If the SNR is not above the limit value, that is to say $SNR \leq Th_{SNR}$, then the first algorithm 25 is applied again to the input audio signal 8 in order to generate the output audio signal 12. If however the SNR is above the predefined limit value $Th_{SNR}$, that is to say $SNR > Th_{SNR}$, then a quantitative measure m of the speech quality of the speech component 18 contained in the input audio signal 8 is ascertained for the further processing of the input audio signal 8 in the manner described below. Articulatory and/or prosodic properties of the speech signal 18 are quantitatively acquired for this purpose. The term speech signal component 26 contained in the input audio signal 8 should in this case be understood to mean those signal components of the input audio signal 8 that represent the speech component 18 of the sound 6 from which the input audio signal 8 is generated by way of the input transducer 4.

In order to ascertain said quantitative measure m, the input audio signal 8 is split into individual signal paths.

For a first signal path 32 of the input audio signal 8, a centroid wavelength $\lambda_C$ is first of all ascertained and compared with a predefined limit value for the centroid wavelength $Th_\lambda$. If it is identified, on the basis of said limit value of the centroid wavelength $Th_\lambda$, that the signal components in the input audio signal 8 are of sufficiently high frequency, then the signal components are selected in the first signal path 32, possibly after appropriately selected temporal smoothing (not illustrated), for a low frequency range NF and a higher frequency range HF above the low frequency range NF. One possible split may for example be such that the low frequency range NF comprises all frequencies $f_N \leq 2500$ Hz, in particular $f_N \leq 2000$ Hz, and the higher frequency range HF comprises frequencies $f_H$ where 2500 Hz$<f_H \leq 10000$ Hz, in particular 4000 Hz$\leq f_H \leq 8000$ Hz or 2500 Hz$<f_H \leq 5000$ Hz.

The selection may be made directly in the input audio signal 8 or else be made such that the input audio signal 8 is split into individual frequency bands by way of a filter bank (not illustrated), wherein individual frequency bands are assigned to the low or higher frequency range NF or HF depending on the respective band limits.

A first energy E1 is then ascertained for the signal contained in the low frequency range NF and a second energy E2 is ascertained for the signal contained in the higher frequency range HF. A quotient QE is then formed from the second energy as numerator and the first energy E1 as denominator. The quotient QE, if the low and higher frequency range NF, HF are selected appropriately, may then be applied as a characteristic variable 33 that is correlated with dominance of consonants in the speech signal 18. The characteristic variable 33 thus allows a statement about an articulatory property of the speech signal components 26 in the input audio signal 8. A value of the quotient QE>>1 (that is to say $QE>Th_{QE}$ with a predefined limit value $Th_{QE}>>1$ not illustrated in more detail) may thus for example infer a high dominance of consonants, while a value QE<1 may infer a low dominance.

In a second signal path 34, a distinction 36 is made in the input audio signal 8 between voiced temporal sequences V and unvoiced temporal sequences UV based on correlation measurements and/or based on a zero crossing rate of the input audio signal 8. Based on the voiced and unvoiced temporal sequences V and UV, a transition TS from a voiced temporal sequence V to an unvoiced temporal sequence UV is ascertained. The length of a voiced or unvoiced temporal sequence may for example be between 10 and 80 ms, in particular between 20 and 50 ms.

An energy Ev for the voiced temporal sequence V prior to the transition TS and an energy En for the unvoiced temporal sequence UV following the transition TS is then in each case ascertained for at least one frequency range (for example a selection of particularly meaningful frequency bands ascertained as being suitable, for example frequency bands 16 to 23 on the Bark scale, or frequency bands 1 to 15 on the Bark scale). In this case, appropriate energies prior to and following the transition TS may in particular also be ascertained in each case separately for more than one frequency range. It is then determined how the energy changes at the transition TS, for example through a relative change $\Delta E_{TS}$ or through a quotient (not illustrated) of the energies Ev, En prior to and following the transition TS.

The measure of the change of the energy, that is to say in this case the relative change, is then compared with a limit value $Th_E$, ascertained beforehand for good articulation, for energy distribution at transitions. A characteristic variable 35 may in particular be formed based on a ratio of the relative change $\Delta E_{TS}$ and said limit value $Th_E$ or based on a relative deviation of the relative change $\Delta E_{TS}$ from this limit value $Th_E$. Said characteristic variable 35 is correlated with the articulation of the transitions from voiced and unvoiced sounds in the speech signal 18, and thus makes it possible to conclude as to a further articulatory property of the speech signal components 26 in the input audio signal 8. It is generally applicable here that a transition between voiced and unvoiced temporal sequences is articulated more precisely the faster, that is to say the more temporally definable, a change in the energy distribution takes place across the frequency ranges relevant to voiced and unvoiced sound.

For the characteristic variable 35, it is however also possible to consider an energy distribution into two frequency ranges (for example the abovementioned frequency ranges in accordance with the Bark scale, or else in the low and upper frequency range NF, HF), for example via a quotient of the respective energies or a comparable characteristic value, and to apply a change in the quotient or the characteristic value across the transition for the characteristic variable. A rate of change of the quotient or of the characteristic variable may thus for example be determined and compared with a reference value, ascertained beforehand as being suitable, for the rate of change.

Transitions from unvoiced temporal sequences may also be considered in the same way in order to form the characteristic variable 35. The specific embodiment, in particular in terms of the frequency ranges and limit or reference value to be used, may generally be achieved based on empirical results regarding a corresponding significance of the respective frequency bands or groups of frequency bands.

In a third signal path 38, a fundamental frequency $f_G$ of the speech signal component 26 is acquired in a temporally resolved manner in the input audio signal 8, and a temporal stability 40 is ascertained for said fundamental frequency $f_G$ based on a variance of the fundamental frequency $f_G$. The temporal stability 40 may be used as a characteristic variable 41 that allows a statement about a prosodic feature (i.e., prosodic property) of the speech signal components 26 in the input audio signal 8. A stronger variance in the fundamental frequency $f_G$ may in this case be used as an indicator for better speech intelligibility, while a monotonic fundamental frequency $f_G$ comprises lower speech intelligibility.

In a fourth signal path 42, a level LVL is acquired in a temporally resolved manner for the input audio signal 8 and/or for the speech signal component 26 contained therein, and a temporal mean $MN_{LVL}$ is formed over a time interval 44 that is predefined in particular based on corresponding empirical findings. The maximum $MX_{LVL}$ of the level of LVL is also ascertained over the time interval 44. The maximum $MX_{LVL}$ of the level LVL is then divided by the temporal mean $MN_{LVL}$ of the level LVL, and a characteristic variable 45 correlated with a volume of the speech signal 18 is thus ascertained, this allowing a further statement about a prosodic property of the speech signal components 26 in the input audio signal 8. Instead of the level LVL, another variable correlated with the volume and/or the energy content of the speech signal component 26 may also be used here.

The characteristic variables 33, 35, 41 and 45 respectively ascertained, as described, in the first to fourth signal path 32, 34, 38, 42 may then each be used individually as the quantitative measure m of the quality of the speech component 18 contained in the input audio signal 8, on the basis of which a second algorithm 46 is then applied to the input audio signal 8 for signal processing purposes. The second algorithm 46 may in this case be derived from the first algorithm 25 through an appropriate change of one or more signal processing parameters made on the basis of the relevant quantitative measure m, or provide a completely standalone auditory program.

An individual value may in particular also be determined as quantitative measure m of the speech quality based on the characteristic variables 33, 35, 41 or 45 ascertained as described, for example through a weighted mean or a product of the characteristic variables 33, 35, 41, 45 (schematically illustrated in FIG. 2 by the combination of the characteristic variables 33, 35, 41, 45). The individual characteristic variables may in this case in particular be weighted based on weighting factors that are ascertained empirically beforehand and that are able to be determined based on the significance of the articulatory or prosodic property of the speech quality as acquired by the respective characteristic variable.

If the quantitative measure m is additionally intended to acquire the precision of predefined formants of vowels in the speech signal 18, a signal component of the speech signal 18 in at least one formant range in the frequency space may be ascertained and a level or a signal variable correlated with the level may be ascertained for the signal component of the speech signal 18 in the relevant formant range (not illustrated). A corresponding characteristic variable that is correlated with the precision of formants is then determined based on a maximum value and/or based on a temporal stability of the level or of the signal variable correlated with the level. The frequency range of the first formants F1 (preferably 250 Hz to 1 kHz, particularly preferably 300 Hz to 750 Hz) or of the second formants F2 (preferably 500 Hz to 3.5 kHz, particularly preferably 600 Hz to 2.5 kHz) may in particular be selected in this case as the at least one formant range, or two formant ranges of the first and second formants are selected. A plurality of first and/or second formant ranges assigned to different vowels (that is to say the frequency ranges that are assigned to the first and second formants of the respective vowel) may in particular also be selected. The signal component is then ascertained for the one or more selected formant ranges, and a signal variable, correlated with the level, of the respective signal component is determined. The signal variable may in this case be the level itself, or else the possibly appropriately smoothed maximum signal amplitude. Based on a temporal stability of the signal variable, which is in turn able to be ascertained through a variance of the signal variable over an appropriate time window, and/or based on a deviation of the signal variable from its maximum value over an appropriate time window, it is then possible to make a statement as to the precision of formants to the extent that a low variance and a low deviation from the maximum level for an articulated sound (the length of the time window may in particular be selected depending on the length of an articulated sound) mean high precision.

Figure 3:
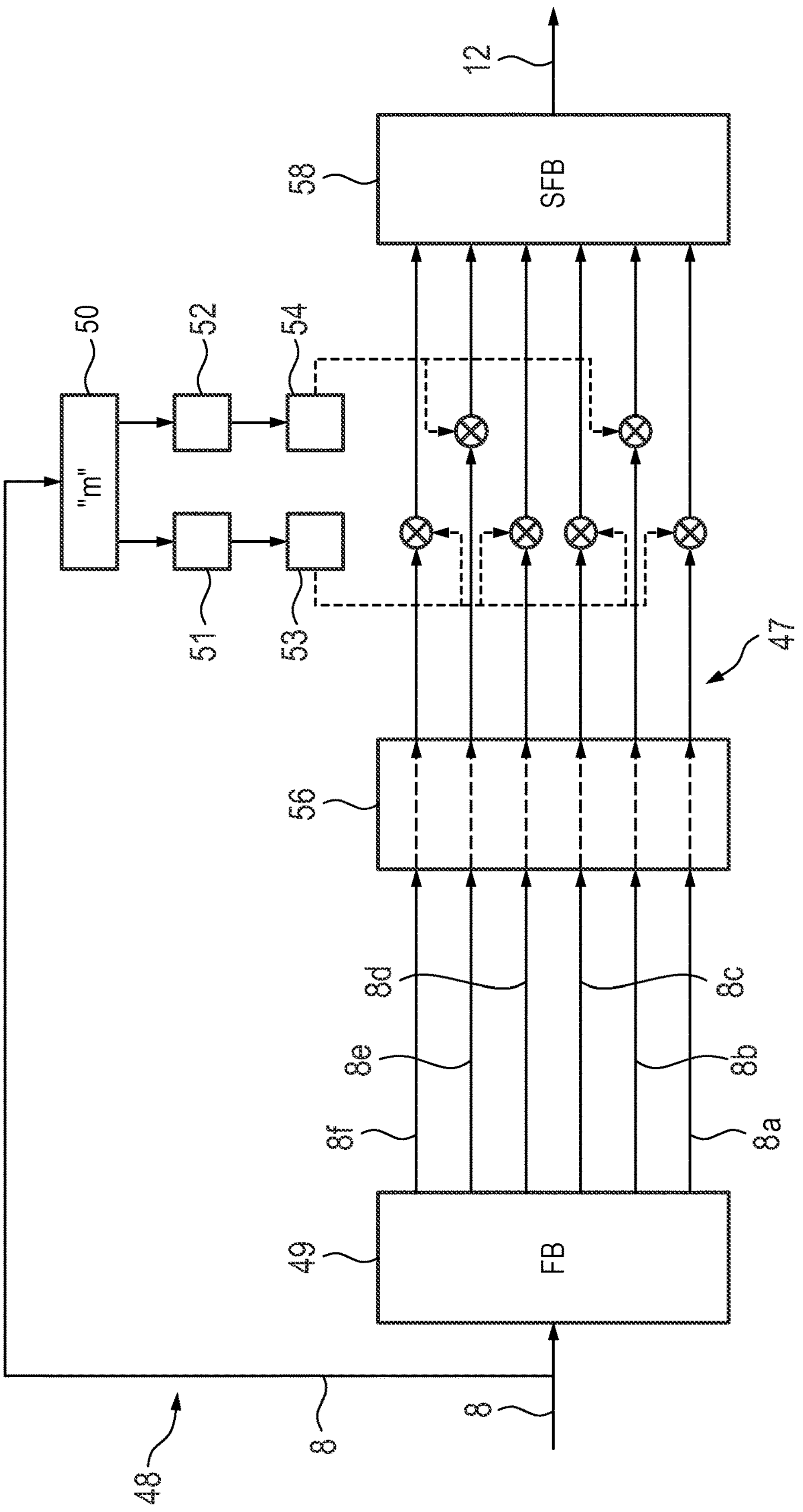
FIG. 3 shows a block diagram of a method for setting the signal processing operation of the hearing aid according to FIG. 1 on the basis of an ascertained speech quality.

FIG. 3 shows a block diagram of the setting of the signal processing operation on the input audio signal 8 according to FIG. 1 on the basis of the speech quality as is quantitatively acquired using the method shown in FIG. 2. From the input audio signal 8, there is a split here on the one hand into a main signal path 47 and an additional signal path 48. In the main signal path 47, the actual processing of the signal component of the input audio signal 8 takes place, in a manner yet to be described, such that the output audio signal 12 is subsequently formed from these processed signal components. In the additional signal path, control variables for said processing of the signal components in the main signal path 47 are obtained in a manner yet to be described. In this case, a quantitative measure m of the speech quality of the signal component, contained in the input audio signal 8, of a speech signal is ascertained in the additional signal path 48, as described with reference to FIG. 2.

The input audio signal 8 is additionally split into individual frequency bands 8a-8f at a filter bank FB 49 (the division may in this case comprise a significantly larger number than the six frequency bands 8a-8f, which are illustrated merely schematically). The filter bank 49 is in this case illustrated as a separate switching element, but it is however also possible to use the same filter bank structure that is used in the course of ascertaining the quantitative measure m in the additional signal path 48, or the signal may be split once in order to ascertain the quantitative measure m, such that individual signal components in the generated frequency bands are used to ascertain the quantitative measure m of the speech quality in the additional signal path 48, on the one hand, and are appropriately processed further in order to generate the output audio signal 12 in the main signal path 47, on the other hand.

The ascertained quantitative measure m may in this case for example constitute an individual variable, on the one hand, which rates only a specific articulatory property of the speech signal 18 according to FIG. 1, such as for instance a dominance of consonants or a precision of transitions between voiced and unvoiced temporal sequences or a precision of formants, or a specific prosodic property such as for example a temporal stability of the fundamental frequency $f_G$ of the speech signal 18 or an accentuation of the speech signal 18 via a corresponding variation in the maximum level with regard to a temporal mean of the level. On the other hand, the quantitative measure m may also be formed as a weighted mean from multiple characteristic variables, each of which rates one of said properties, such as for example a weighted mean of the characteristic variables 33, 35, 41, 45 according to FIG. 2.

The quantitative measure m should in this case be designed as a binary measure 50 such that it adopts a first value 51 or a second value 52. The first value 51 in this case indicates a sufficiently good speech quality, while the second value 52 indicates an insufficient speech quality. This may in particular be achieved by virtue of dividing an inherently continuous value range of a characteristic variable, such as the characteristic variables 31, 33, 41 or 45 that are determined in order to ascertain the quantitative measure m of the speech quality, according to FIG. 2, or a corresponding weighted mean of a plurality of such characteristic variables, into two ranges, and the first value 51 is assigned to one range, while the second value 52 is assigned to the other range. In this case, for the assignment to the first or second value 51, 52, the individual ranges of the value range for the characteristic variable or the mean of characteristic variables should preferably be selected such that an assignment to the first value 51 actually corresponds to a sufficiently high speech quality that no further processing whatsoever of the input audio signal 8 is required anymore, in order to guarantee sufficient intelligibility of the corresponding speech signal components in the output sound 16 generated from the output audio signal 12.

The first value 51 of the quantitative measure is in this case assigned to a first parameter value 53 for the signal processing operation, which may be formed in particular by the value implemented in each case in the first algorithm 25 according to FIG. 2. This means that: The first parameter value 53 is formed in particular by a specific value of at least one parameter of the signal processing operation, that is to say for example (here in each case for a relevant frequency band) by a gain factor, a compression knee point, a compression ratio, a time constant or AGC, or a directional parameter of a directional signal. The first parameter value may in particular be formed by a vector of values for a plurality of said signal control variables. The specific numerical value of the first parameter value 53 in this case corresponds to the value that the parameter adopts in the first algorithm 25.

The second value 52 is assigned to a second parameter value 54 for the signal processing operation, this in particular being able to be formed by the value implemented in each case in the second algorithm 46 according to FIG. 2 for the gain factor, the compression knee point, the compression ratio, the time constant of the AGC or the directional parameter.

The signal components in the individual frequency bands 8*a*-8*f* are then subjected to analysis 56 as to whether the respective frequency band 8*a*-8*f* contains signal components of a speech signal. If this is not the case (in the present example for the frequency bands 8*a*, 8*c*, 8*d*, 8*f*), then the first parameter value 53 is applied to the input audio signal 8 for the signal processing operation (for example as a vector of gain factors for the affected frequency bands 8*a*, 8*c*, 8*d*, 8*f*). These frequency bands 8*a*, 8*c*, 8*d*, 8*f* are subjected to a signal processing operation that does not require any additional improvement of the speech quality, for instance because no speech signal component is present or since the speech quality is already sufficiently good.

If however this is not the case, and the quantitative measure m adopts the second value 52, then the second parameter value 54 for the signal processing operation is applied to those frequency bands 8*b* and 8*e* in which a speech component has been identified (this signal processing operation corresponding to a signal processing operation in accordance with the second algorithm 46 according to FIG. 2). In this case, in particular in the event that the quantitative measure m was ascertained based on a characteristic variable that allows a statement about the articulation of consonants (for example the characteristic variables 31 and 35 according to FIG. 2 that depend on the dominance of consonants or the precision of transitions between voiced and unvoiced temporal sequences), the second parameter value 54 for the higher frequency band 8*e* may provide additional boosting of the gain when this frequency band 8*e* contains a particular concentration of acoustic energy for an articulation of consonants.

The signal components of the individual frequency bands 8*a*-8*f* are then combined, following the signal processing operation on the respective signal components as described above, with the first parameter value 53 (for the frequency bands 8*a*, 8*c*, 8*d*, 8*f*) or the second parameter value 54 (for the frequency bands 8*b*, 8*e*) in a synthesis filter bank SFB 58, with the output audio signal 12 being generated.

Figure 4:
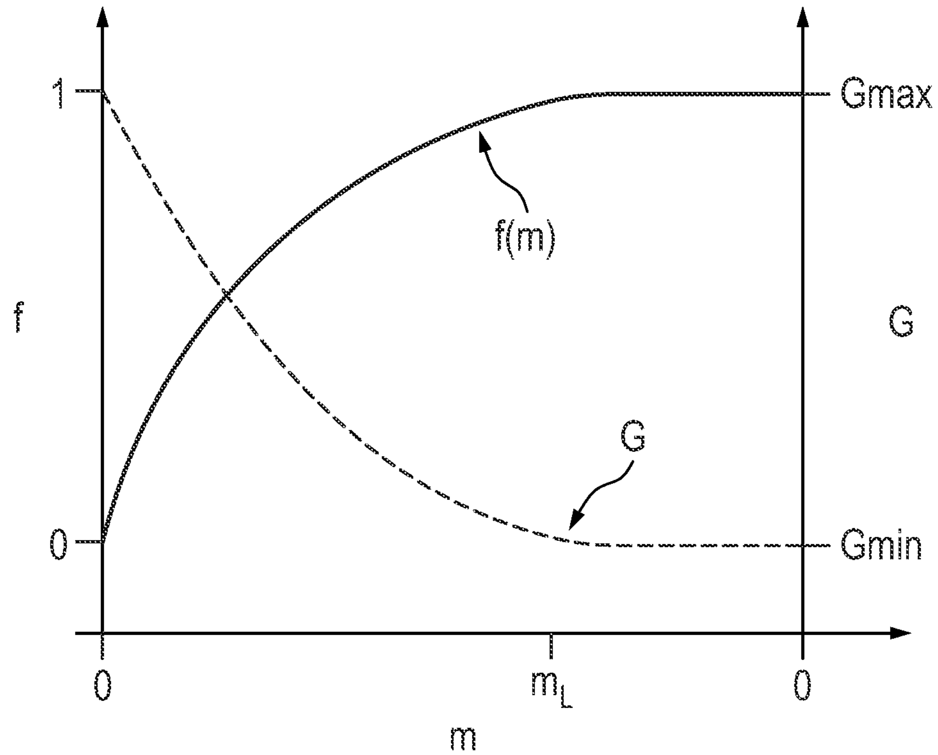
FIG. 4 shows a graph of a function for a control variable of the signal processing operation according to FIG. 3 as a function of the quantitative measure of the speech quality according to FIG. 2.

FIG. 4 illustrates a graph of a function f for a parameter G for controlling a signal processing operation as a function of a quantitative measure m of a speech quality of a speech signal. The parameter G is not restricted to a gain, but rather may in this case be formed by one of the abovementioned control variables or, in the case of a vector-value parameter, concern an entry in the vector. The quantitative measure m has a continuous value range between 0 and 1 for the example according to FIG. 4, wherein the value 1 indicates a maximum good speech quality, and the value 0 indicates a maximum poor speech quality. A characteristic variable used to ascertain the quantitative measure m may in particular be normalized here in an appropriate manner in order to limit the value range for the quantitative measure to the interval [0, 1].

The function f (solid line, left-hand scale) is in this case generated so as subsequently to be able to constantly interpolate the parameter G (dashed line, right-hand scale) by way of the function f between a maximum parameter value Gmax and a minimum parameter value Gmin. The value 1 for the quantitative measure m is then assigned the function value f(1)=1, and the value 0 is assigned the function value f(0)=0. The parameter g is in this case such that the parameter value Gmin is applied for the signal processing for good speech quality (that is to say m=1), and the parameter value Gmax is applied for poor speech quality (that is to say m=0). For values of m above a limit value $m_L$, the speech quality is still considered to be "sufficiently good", meaning that no deviation of the parameter G from the corresponding minimum parameter value Gmin is considered to be necessary for "good speech quality"; the function f (m) for $m \geq m_L$ is thus f (m)=1, and accordingly G=Gmin. Below the limit value $m_L$, the quantitative measure m of the speech quality is depicted as rising constantly monotonically to f (m) (with an almost exponential curve here), such that, for the value m=0 or $m=m_L$, the function, as required, adopts the values f (0)=0 or $f(m_L)=1$. For the associated parameter G, this means that, for m>0, G decreases from Gmax increasingly sharply to Gmin (for $m=m_L$). The relationship between the function f and the parameter g may be represented for example as $$G(m)=G\max-f(m)\cdot(G\min-G\max)$$

Although the invention has been described and illustrated in more detail through the preferred exemplary embodiment, the invention is not restricted to the disclosed examples, and other variations may be derived therefrom by a person skilled in the art without departing from the scope of protection of the invention.

The following is a summary list of reference numerals and the corresponding structure used in the above description of the invention:

1 Hearing device
2 Hearing aid
4 Input transducer
6 Sound from the surroundings
8 Input audio signal
8*a-f* Frequency bands
10 Signal processing apparatus
12 Output audio signal
14 Output transducer
16 Output sound
18 Speech signal
20 Sound components
25 First algorithm
26 Speech signal component
32 First signal path
33 Characteristic variable
34 Second signal path
35 Characteristic variable
36 Distinction
38 Third signal path
40 Temporal stability

41 Characteristic variable
42 Fourth signal path
44 Time interval
45 Characteristic variable
46 Second algorithm
47 Main signal path
48 Additional signal path
48 Filter bank
50 Binary measure
51 First value (of the binary measure)
52 Second value (of the binary measure)
53 First parameter value
54 Second parameter value
56 Analysis (on speech components)
58 Synthesis filter bank
$\Delta E_{TS}$ Relative change (of the energy at the transition)
$\lambda_C$ Centroid wavelength
E1 First energy
E2 Second energy
Ev Energy (prior to the transition)
En Energy (following the transition)
$f_G$ Fundamental frequency
G Parameter
Gmin Minimum parameter value
Gmax Maximum parameter value
HF Higher frequency range
LVL Level
m Quantitative measure of speech quality
$m_L$ Limit value
$MN_{LVL}$ Temporal mean (of the level)
$MX_{LVL}$ Maximum of the level
NF Low frequency range
QE Quotient
SNR Signal-to-noise ratio (SNR)
$Th_\lambda$ Limit value (for the centroid wavelength)
$Th_E$ Limit value (for the relative change of the energy)
$Th_{SNR}$ Limit value (for the SNR)
TS Transition
V Voiced temporal sequence
VAD Speech activity identification
UV Unvoiced temporal sequence

The invention claimed is:

1. A method of operating a hearing device on a basis of a speech signal, the method which comprises:

recording with an acousto-electric input transducer of the hearing device a sound which contains the speech signal from surroundings of the hearing device, and converting the sound into an input audio signal;

performing a signal processing operation for generating an output audio signal based on the input audio signal;

quantitatively acquiring at least one articulatory and/or prosodic feature of the speech signal through analysis of the input audio signal by way of the signal processing operation, and deriving from the property a quantitative measure of a speech quality of the speech signal; and setting at least one parameter of the signal processing operation for generating the output audio signal on a basis of the quantitative measure of the speech quality of the speech signal; and selectively deriving the quantitative measure as a binary measure or as a discrete measure or as a continuous measure, and:

a) when the quantitative measure is a binary measure:

the binary measure adopting a first value or a second value depending on the speech quality;

wherein the first value is assigned to a sufficiently good speech quality of the speech signal and the second value is assigned to an insufficient speech quality of the speech signal;

wherein, for the first value, the at least one parameter of the signal processing operation is preset to a first parameter value that corresponds to a regular mode of the signal processing operation; and wherein, for the second value, the at least one parameter of the signal processing operation is set to a second parameter value different from the first parameter value; or b) when the quantitative measure is a discrete measure:

the discrete measure adopting a value from a value range of at least three discrete values depending on the speech quality; and mapping individual values of the quantitative measure monotonically onto corresponding discrete parameter values for the at least one parameter; or c) when the quantitative measure is a continuous measure:

the continuous measure adopting a value from a continuous value range depending on the speech quality; and mapping individual values of the quantitative measure monotonically onto corresponding parameter values from a continuous parameter interval for the at least one parameter.

2. The method according to claim 1, wherein the at least one parameter is selected from the group consisting of:

a gain factor;
a compression ratio;
a knee point of a compression;
a time constant of an automatic gain control operation;
a magnitude of noise suppression; and
a directional effect of a directional signal.

3. The method according to claim 2, which comprises, when the quantitative measure indicates worsening of the speech quality, increasing the gain factor; or
increasing the compression ratio; or
lowering the knee point of the compression; or
shortening the time constant; or
attenuating the noise suppression; or
increasing the directional effect.

4. The method according to claim 2, which comprises, when the quantitative measure indicates an improvement in the speech quality, lowering the gain factor; or
reducing the compression ratio; or
increasing the knee point of the compression; or
lengthening the time constant; or
increasing the noise suppression; or
reducing the directional effect.

5. The method according to claim 1, which comprises:

inspecting a multiplicity of frequency bands for signal components of the speech signal; and setting the at least one parameter of the signal processing operation on the basis of the quantitative measure of the speech quality of the speech signal only in those frequency bands in which a sufficiently high signal component of the speech signal is ascertained.

6. The method according to claim 1, which comprises:

for the quantitative measure of the speech quality as the articulatory property of the speech signal, acquiring at least one of:

a characteristic variable correlated with a precision of predefined formants of vowels in the speech signal;

a characteristic variable correlated with a dominance of consonants in the speech signal; or a characteristic variable correlated with a precision of transitions from voiced and unvoiced sounds;

and/or:

for the quantitative measure as the prosodic feature of the speech signal, acquiring at least one of:

a characteristic variable correlated with a temporal stability of a fundamental frequency of the speech signal; or a characteristic variable correlated with an acoustic intensity of accents of the speech signal.

7. The method according to claim 6, which comprises acquiring as the articulatory property of the speech signal a characteristic variable correlated with a dominance of fricatives in the speech signal.

8. The method according to claim 6, which comprises:

acquiring, for the quantitative measure of the speech quality as an articulatory property of the speech signal, a characteristic variable correlated with an articulation of consonants; and boosting a gain factor of at least one frequency band characteristic for a formation of consonants as the at least one parameter when the quantitative measure indicates an insufficient articulation of consonants.

9. The method according to claim 1, which comprises, with the quantitative measure being a binary measure, for a transition of the quantitative measure from the first value to the second value, constantly fading the at least one parameter from the first parameter value to the second parameter value.

10. The method according to claim 1, which comprises:

detecting a speech activity and/or ascertaining a signal-to-noise ratio in the input audio signal; and additionally setting the at least one parameter of the signal processing operation for generating the output audio signal based on the input audio signal on the basis of the quantitative measure of the speech quality of the speech signal based on the detected speech activity or the ascertained signal-to-noise ratio.

11. A hearing device, comprising:

an acousto-electric input transducer configured to record a sound from surroundings of the hearing device and to convert the sound into an input audio signal;

a signal processing apparatus connected to said input transducer and configured to generate an output audio signal from the input audio signal; and an electro-acoustic output transducer connected to said signal processing apparatus and configured to convert the output audio signal into an output sound; and wherein said input transducer, said signal processing apparatus, and said output transducer are configured to perform the following method steps:

recording with said input transducer a sound which contains the speech signal from surroundings of the hearing device, and converting the sound into an input audio signal;

performing a signal processing operation for generating an output audio signal based on the input audio signal;

quantitatively acquiring at least one articulatory and/or prosodic feature of the speech signal through analysis of the input audio signal by way of the signal processing operation, and deriving from the property a quantitative measure of a speech quality of the speech signal; and setting at least one parameter of the signal processing operation for generating the output audio signal on a basis of the quantitative measure of the speech quality of the speech signal; and selectively deriving the quantitative measure as a binary measure or as a discrete measure or as a continuous measure, and:

a) with the quantitative measure being a binary measure:

the binary measure adopting a first value or a second value depending on the speech quality;

wherein the first value is assigned to a sufficiently good speech quality of the speech signal and the second value is assigned to an insufficient speech quality of the speech signal;

wherein, for the first value, the at least one parameter of the signal processing operation is preset to a first parameter value that corresponds to a regular mode of the signal processing operation; and wherein, for the second value, the at least one parameter of the signal processing operation is set to a second parameter value different from the first parameter value; or b) with the quantitative measure being a discrete measure:

the discrete measure adopting a value from a value range of at least three discrete values depending on the speech quality; and mapping individual values of the quantitative measure monotonically onto corresponding discrete parameter values for the at least one parameter; or c) with the quantitative measure being a continuous measure:

the continuous measure adopting a value from a continuous value range depending on the speech quality; and mapping individual values of the quantitative measure monotonically onto corresponding parameter values from a continuous parameter interval for the at least one parameter.

12. The hearing device according to claim 11, being a hearing aid.

* * * * *